J. S. F. HUDDLESTON.
Thermometer.
No. 199,442. Patented Jan. 22, 1878.
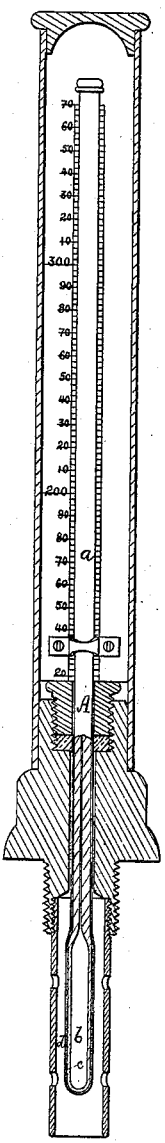
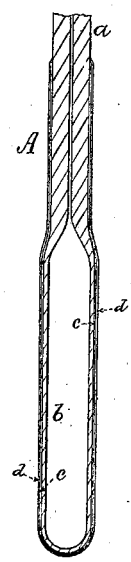
Witnesses
S. N. Piper
L. W. Miller
Inventor
John S. F. Huddleston.
by his attorney,
R. H. Eddy

UNITED STATES PATENT OFFICE.

JOHN S. F. HUDDLESTON, OF BOSTON, MASSACHUSETTS.

IMPROVEMENT IN THERMOMETERS.

Specification forming part of Letters Patent No. 199,442, dated January 22, 1878; application filed January 4, 1878.

*To all whom it may concern:*

Be it known that I, JOHN S. F. HUDDLESTON, of Boston, of the county of Suffolk and State of Massachusetts, have invented a new and useful Improvement in Thermometers, or the glass tubes thereof; and do hereby declare the same to be described in the following specification and represented in the accompanying drawings, of which—

Figure 1 denotes an elevation, Fig. 2 a longitudinal section, and Fig. 3 a transverse section, of the bulb or lower portion of a thermometer glass tube provided with my invention. Fig. 4 is a vertical section of a thermometer having its tube re-enforced, as hereinafter set forth.

In various chemical processes wherein thermometers are used the glass tubes, especially the bulbs thereof, are liable to be rapidly damaged by steam or corrosive agents, liquid or gaseous. The vitreous polish or surface being once more or less destroyed or effaced, the glass frequently becomes rendered unfit for use.

To avoid this is the object of my invention, which consists in a thermometer glass tube re-enforced by one or more layers of metal deposited on and entirely and intimately covering the bulb, or such and a small portion of the stem extending therefrom. Such metallic re-enforce I produce mainly by the process of electroplating.

In carrying out my invention I first intimately deposit on the surface to be protected a thin coating of silver by the method hereinafter explained, or by what is known as "Drayton's silvering process," which consists in the employment of a silvering-fluid obtained by mixing ammonia with a solution of nitrate of silver, and adding thereto grape-sugar or oil of cassia and alcohol, to which, in order to effect the precipitation of the silver, a reducing solution consisting of one part oil of cloves to three parts alcohol is to be added. The bulb and part of the stem to be covered should be immersed in the solution. After having been suffered to remain therein for an hour or two the glass surface exposed will be found to be intimately coated with silver.

Preparatory to metallizing the bulb, or such and part of the stem, I usually wind around the stem, at the point of termination of the silvering, the end portion of a fine metallic wire. I next effect the silvering, which may be also accomplished as follows: Prepare in separate vessels two solutions, the first being composed of twenty-four grains of nitrate of silver and about four ounces of distilled water, and the second of twenty grains of Rochelle salts and four ounces of distilled water. Next add in small quantities to the first of the solutions liquid ammonia until, after the formation of a gray precipitate, the solution may become clear, being careful to stir the solution in the meantime with a glass rod. After allowing the solution to settle, the clear portion of it should be poured into a clear vessel, and be added to and thoroughly mixed with the second solution.

Into the compound solution thus formed the tube is to be suspended the necessary distance—viz., at least up to the junction of the wire with it; and the tube should remain so immersed for from one to two hours, or until the portion in the solution may have received upon its outer surface a sufficient coating of silver. After this the tube should be withdrawn from the solution and washed by allowing water to flow over or upon the silvered part or parts.

Next there should be deposited upon the layer of silver thus fixed on the bulb, or on it and part of the stem, one or more layers of copper or other suitable metal, which is accomplished by means of a galvanic battery and an electroplating solution or bath, the wire attached to the stem being led to one pole of the battery. The solution used for effecting the metallic deposit and the mode of carrying out such are not necessary for me to describe, such being well understood by silverplaters and manufacturers of plated ware.

In the drawings, A denotes the thermometer-tube, of which *a* is the stem, and *b* the bulb, *c* being the primary or first coating of silver, and *d* being the secondary or surrounding one of copper or other suitable metal.

The great advantage of thus re-enforcing the bulb, or such and the next adjacent part of the stem, of a thermometer-tube will be apparent when it is considered that it not only overcomes the liability to injury under circumstances as hereinbefore stated, but it greatly strengthens the bulb, and prevents it from being broken or cracked under sudden changes of temperature or by various other causes.

In some cases, especially when the tube is to be subjected to great pressure, I first cover the part to be re-enforced with a thin coating of vulcanite in the place of the silver, and afterward deposit the copper or other metal on such coating; but generally I prefer the coating of silver as a means of attaching to the tube the stronger metallic covering deposited by the electroplating process.

What I claim as a new manufacture and my invention is—

A thermometer glass tube re-enforced, substantially as described, by metal deposited and fixed thereon by means essentially as specified.

JOHN S. F. HUDDLESTON.

Witnesses:
R. H. EDDY,
JOHN R. SNOW.